(12) United States Patent
Litzba, I et al.

(10) Patent No.: US 11,407,503 B2
(45) Date of Patent: Aug. 9, 2022

(54) BELT DRIVE ARRANGEMENT FOR A DRIVE TRAIN OF A HELICOPTER

(71) Applicant: ZF Friedrichshafen AG, Friedrichshafen (DE)

(72) Inventors: Jörg Litzba, I, Fuldatal (DE); Martin Kühne, Breuna (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 277 days.

(21) Appl. No.: 16/549,870

(22) Filed: Aug. 23, 2019

(65) Prior Publication Data

US 2020/0070964 A1 Mar. 5, 2020

(30) Foreign Application Priority Data

Aug. 30, 2018 (DE) ..................... 10 2018 214 789.2

(51) Int. Cl.
| | | |
|---|---|---|
| *B64C 27/12* | (2006.01) | |
| *F16H 55/36* | (2006.01) | |
| *B64D 35/00* | (2006.01) | |
| *F16D 3/12* | (2006.01) | |
| *F16H 7/02* | (2006.01) | |

(52) U.S. Cl.
CPC .............. *B64C 27/12* (2013.01); *B64D 35/00* (2013.01); *F16D 3/12* (2013.01); *F16H 7/02* (2013.01); *F16H 55/36* (2013.01)

(58) Field of Classification Search
CPC ..... F16H 55/36; F16D 3/12; B64C 27/12–14; B64D 35/00
See application file for complete search history.

(56) References Cited

U.S. PATENT DOCUMENTS

| | | | | |
|---|---|---|---|---|
| 2,067,109 A | * | 1/1937 | Spirito .................. | B64D 35/00 464/95 |
| 2,947,497 A | * | 8/1960 | Sznycer ................. | B64C 27/12 244/17.11 |
| 4,840,330 A | * | 6/1989 | von Broock .......... | B64C 27/001 188/378 |
| 5,954,480 A | * | 9/1999 | Schmaling ............ | B64C 27/001 416/145 |
| 7,490,792 B1 | * | 2/2009 | Carter, Jr. ............. | B64C 27/001 244/17.27 |
| 9,194,438 B2 | * | 11/2015 | Dell ..................... | F16F 15/1232 |

(Continued)

FOREIGN PATENT DOCUMENTS

DE 10 2010 062 325 A1 6/2012

OTHER PUBLICATIONS

Search Report for DE 10 2018 214 789.2, dated Jul. 26, 2019, 10 pp.

*Primary Examiner* — Michael R Mansen
*Assistant Examiner* — Mark K Buse
(74) *Attorney, Agent, or Firm* — Crowell & Moring LLP

(57) ABSTRACT

The invention relates to a belt drive assembly for a drive train of a helicopter, comprising a drive shaft that can be functionally connected to a crankshaft of a drive machine of the helicopter, wherein the drive shaft is functionally connected to a belt disk via a torsional vibration damper, wherein the belt disk can rotate via a bearing mechanism on a bearing shaft connected to the drive shaft for conjoint rotation therewith, wherein the belt disk can receive a belt that is functionally connected to a rotor system of the helicopter.

11 Claims, 3 Drawing Sheets

(56) References Cited

U.S. PATENT DOCUMENTS

| | | | | |
|---|---|---|---|---|
| 9,797,469 | B1* | 10/2017 | Serkh | F16D 41/066 |
| 11,014,658 | B1* | 5/2021 | Tesar | B64C 27/625 |
| 2007/0262197 | A1* | 11/2007 | Phelps | B64C 27/10 |
| | | | | 244/17.11 |
| 2009/0121401 | A1* | 5/2009 | Lehmann | F16F 15/123 |
| | | | | 267/215 |
| 2010/0183442 | A1* | 7/2010 | Pancotti | B64C 27/12 |
| | | | | 416/144 |
| 2011/0255967 | A1* | 10/2011 | Welsh | F16F 15/366 |
| | | | | 416/1 |
| 2012/0181378 | A1* | 7/2012 | Birkner | B64C 27/025 |
| | | | | 244/17.11 |
| 2015/0027844 | A1* | 1/2015 | Serkh | F16D 7/022 |
| | | | | 192/75 |
| 2015/0053826 | A1* | 2/2015 | Tsunekawa | B64D 35/04 |
| | | | | 244/23 A |
| 2016/0333987 | A1* | 11/2016 | Tran | B60K 25/02 |
| 2017/0241508 | A1* | 8/2017 | Whitmore | F16F 15/023 |
| 2018/0051792 | A1* | 2/2018 | Cariccia | F16F 15/123 |
| 2018/0163788 | A1* | 6/2018 | Dell | F16F 15/16 |
| 2018/0244377 | A1* | 8/2018 | Chan | B64C 27/12 |
| 2020/0070964 | A1* | 3/2020 | Litzba, I | F16H 55/36 |
| 2021/0088106 | A1* | 3/2021 | Rasch | F16D 3/12 |
| 2021/0239201 | A1* | 8/2021 | Hauck | F16D 41/206 |

* cited by examiner

BELT DRIVE ARRANGEMENT FOR A DRIVE TRAIN OF A HELICOPTER

CROSS-REFERENCE TO RELATED APPLICATIONS

This application claims priority from German Patent Application DE 10 2018 214 789.2, filed Aug. 30, 2018, the entirety of which is hereby fully incorporated by reference herein.

The invention relates to a belt drive arrangement for a drive train of a helicopter.

By way of example, DE 10 2010 062 325 A1 discloses a disk-shaped component for a belt drive, in particular for the drive of one or more ancillary units of an internal combustion engine, which can be attached to an output shaft of the internal combustion engine, in particular the crankshaft. The disk-shaped component has a torsional vibration damper, located between an input component dedicated to the output shaft and an output component that can rotate in relation thereto. The input and output components can rotate in relation to one another via a bearing. The bearing is composed of a radially outward bearing flange and a radially inward bearing pin. The bearing flange can be connected to the output shaft of the internal combustion engine.

The problem addressed by the present invention is to create a belt drive arrangement for a drive train of a helicopter. This problem is solved by the subject matter of claim 1. Preferred embodiments are the subject matter of the dependent claims.

A belt drive arrangement according to the invention for a drive train of a helicopter comprises a drive shaft that can be functionally connected to a crankshaft of a drive machine of the helicopter, wherein the drive shaft is functionally connected to a belt disk via a torsional vibration damper, wherein the belt disk can rotate on a bearing shaft that is connected to the drive shaft for conjoint rotation via a bearing assembly, and wherein a belt functionally connected to a rotor system of the helicopter can be received on the belt disk.

In other words, the belt drive arrangement is integrated in the drive train of the helicopter such that a drive torque generated by the drive machine, which is preferably in the form of a piston engine, is dampened via the torsional vibration damper, and at least introduced into the rotor system of the helicopter. In particular, the torsional vibration damper is axially adjacent to the belt disk. The belt disk surrounds the bearing shaft radially, and is rotatably supported thereon.

The term "functionally connected" is understood to mean that two components can be connected directly to one another, or other components can be located in the power train between the two components. Furthermore, two components that are functionally connected to one another can be connected directly to one another, or indirectly, via further components located between them.

The torsional vibration damper preferably comprises a spring mechanism, wherein the spring mechanism couples at least one input element to at least one output element in a manner that dampens vibrations. The at least one input element introduces the drive torque of the drive machine into the torsional vibration damper, wherein the drive torque is transferred to the at least one output element, dampened by the spring mechanism, such that it can then be transferred to the belt disk via the at least one output element. At the same time, the torsional vibration damper allows the drive shaft to be connected to the belt disk via the spring mechanism incorporated therein, such that torque can be transferred in a non-rigid manner.

The at least one input element is preferably located axially between the drive shaft and the bearing shaft, and is connected to the drive shaft and the bearing shaft for conjoint rotation therewith. In other words, either one input element or numerous input elements are located axially between the drive shaft and the bearing shaft. The at least one input element extends radially into the torsional vibration damper and is functionally connected to the spring mechanism therein.

It is also preferred that at least one input element is in the form of an annular disk, and has numerous holes for axially inserting connecting means between the drive shaft and the bearing shaft. In particular, the holes are evenly distributed over the circumference of the annular disk. Preferably, both screw elements as well as shear pins are used as the connecting means. In particular, the screw elements and shear pins are placed in the holes in an alternating sequence over the circumference.

In accordance with one measure that further improves the invention, the at least one output element is located on the front surface of the belt disk, and connected to the belt disk for conjoint rotation. In particular, the at least one output element is connected to the belt disk via numerous screw elements. The at least one output element preferably bears at least in part on a front surface section of the belt disk provided for this.

According to a preferred embodiment, a first and second output element form a housing of the torsional vibration damper, wherein the first output element is in the form of a housing well, and the second output element is in the form of a housing cover. The spring mechanism is also located inside the housing, such that the housing protects the spring mechanism from contaminants and moisture. In particular, respective housing components, specifically the housing well and the housing cover, are supported on respective rings. One of the two rings bears on the bearing shaft and the input element, and the other ring bears on the drive shaft and the input element. The input element is tensioned axially between the two rings.

An ancillary drive shaft is preferably connected to the belt disk for conjoint rotation therewith, wherein the ancillary drive shaft is functionally connected to an ancillary unit of the helicopter. The ancillary unit, or auxiliary unit, is preferably a fan. The drive for the ancillary unit is thus dampened, along with the drive for the rotor system, by the torsional vibration damper, such that torque peaks and operational irregularities, in particular, can be absorbed. Furthermore, wear to the drive components in the drive train can be reduced by the torsional vibration damper.

The invention includes the technical teaching that the bearing mechanism comprises a first and a second tapered roller bearing. The two tapered roller bearings for an O-assembly. In particular, a tensioning sleeve is located between the two tapered roller bearings. A respective outer ring of the respective tapered roller bearing is located on an inner circumferential flange of the belt disk, wherein a respective inner ring of the respective tapered roller bearing is located on an outer circumferential flange of the bearing shaft. The belt disk and the bearing shaft can rotate, at least partially, in relation to one another.

In particular, it is proposed that the belt drive arrangement according to the invention be used in a drive train of a helicopter.

The invention also relates to a helicopter that has a belt drive arrangement according to the invention, wherein the belt drive arrangement is integrated in the drive train of the helicopter, and dampens vibrations. In particular, a drive machine in the form of a piston engine that is functionally connected to the belt drive arrangement is also located in the drive train of the helicopter.

Exemplary embodiments of the belt drive arrangement according to the invention for a drive train of a helicopter shall be explained in greater detail below in reference to the drawings. Therein:

Figure 1:
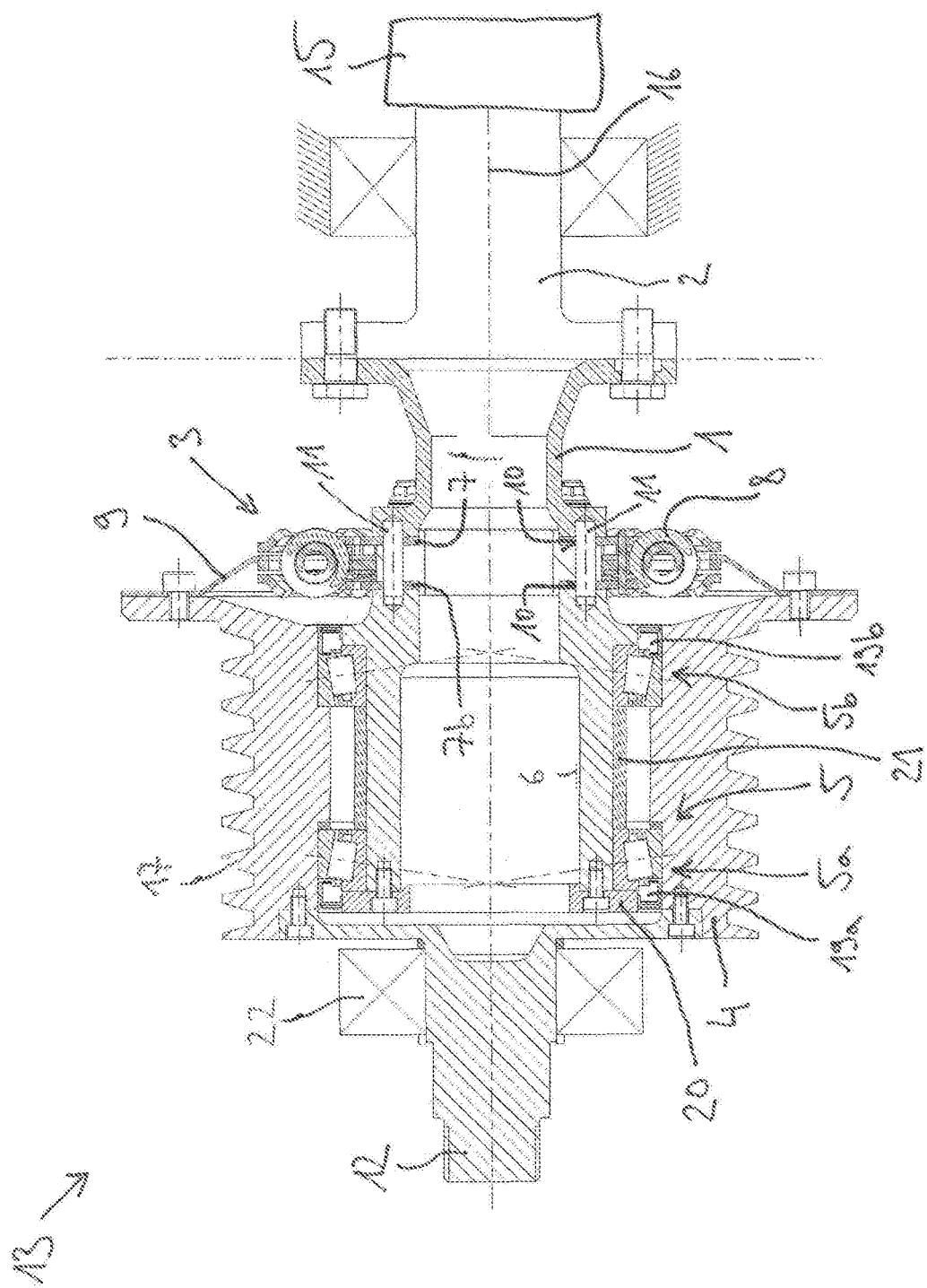
FIG. 1 shows a schematic sectional view of a first embodiment of the belt drive arrangement according to the invention for a drive train of a helicopter.
Figure 2:
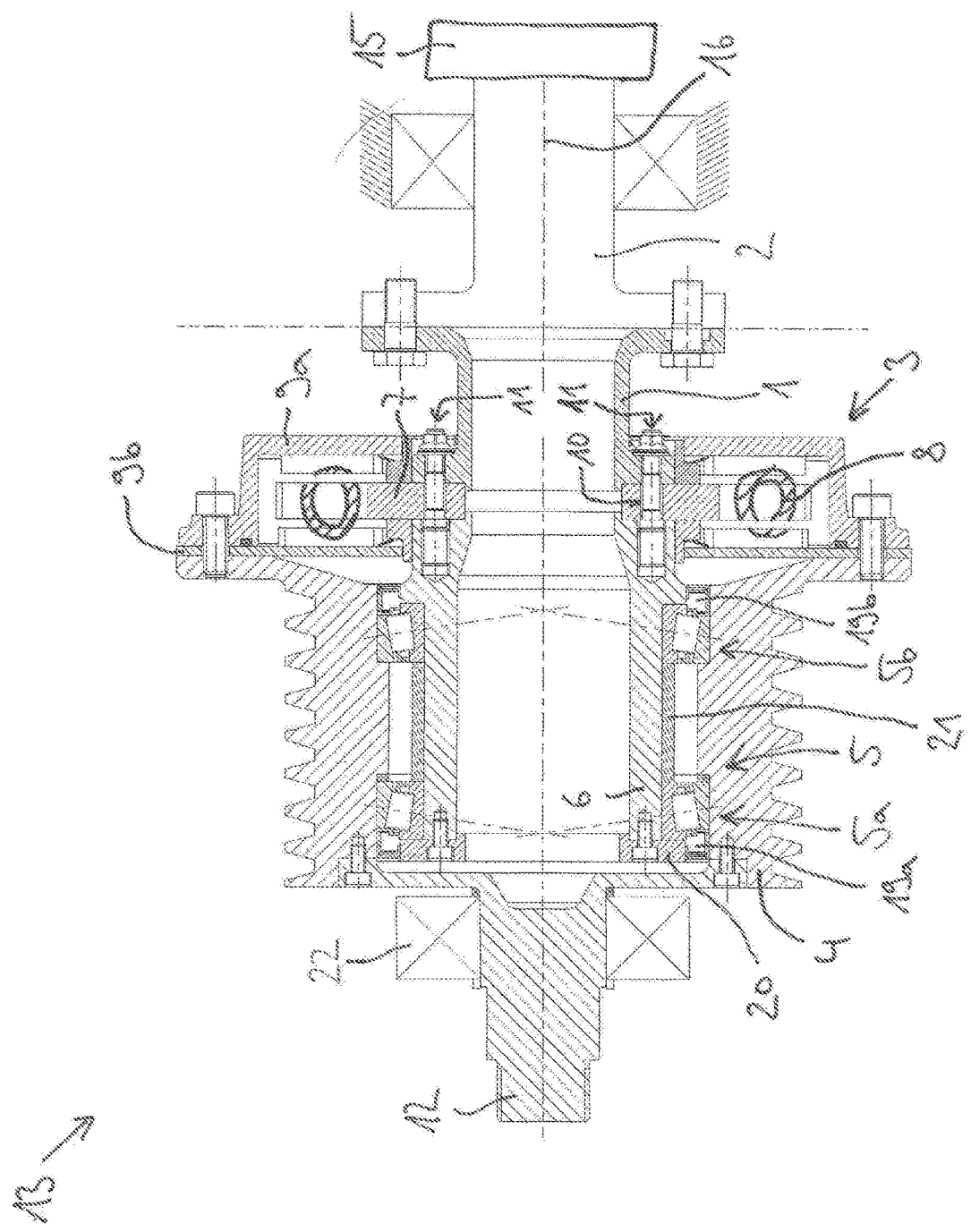
FIG. 2 shows a schematic sectional view of a second embodiment of the belt drive arrangement according to the invention for a drive train of a helicopter.

According to FIG. 1 and FIG. 2, a respective belt drive arrangement 13 according to the invention for a drive train of a helicopter 14 has a drive shaft 1, which is functionally connected to a crankshaft 2 of a drive machine 15 of the helicopter 14. Furthermore—and not shown herein—the drive shaft 1 and the crankshaft 2 can be functionally connected to a starter gear of a drive device. The starter gear can be incorporated in the intersection between the drive shaft 1 and the crankshaft 2. The drive shaft 1 is functionally connected to a belt disk 4 via a torsional vibration damper 3. The torsional vibration damper 3 comprises a spring mechanism 8. The belt disk 4 can rotate via a bearing mechanism 5 on a bearing shaft 6 connected to the drive shaft 1 for conjoint rotation. The bearing mechanism 5 comprises a first and second tapered roller bearing 5a, 5b, wherein the two tapered roller bearings 5a, 5b form an O-assembly. Furthermore, the bearing mechanism 5 is sealed via first and second seals 19a, 19b, dedicated to the respective tapered roller bearings 5a, 5b, and secured axially by a bearing cover 20. A tensioning sleeve 21 is located between the two tapered roller bearings 5a, 5b.

The bearing shaft 6 and the drive shaft 1 are hollow shafts located on a common drive axis 16, together with the crankshaft 2. The belt disk 4 is coaxial to the bearing shaft 6. The belt disk 4 also receives a belt that is functionally connected to a rotor system 18 of the helicopter 14. In the present case, the belt is not shown, although the belt track 17 on the belt disk 4 is shown, which corresponds to the belt. The belt track 17 has numerous V-shaped notches, which can receive at least one, preferably numerous, belts.

Furthermore, the ancillary drive shaft 12 is connected to the belt disk 4 for conjoint rotation. The ancillary drive shaft 12 is intended to be functionally connected to an ancillary unit of the helicopter 14. By way of example, the ancillary unit can be a fan. The ancillary drive shaft 12 can rotate via a bearing element 22. The torque generated by the drive machine 15 is introduced via the torsional vibration damper 3 into both the belt disk 4 and the ancillary drive shaft 12.

According to FIG. 1, the spring mechanism 8 of the torsional vibration damper 3 couples two input elements 7a, 7b to an output element 9 such that vibrations are dampened. The first input element 7a bears on the drive shaft 1 and is functionally connected to the spring mechanism 8. The second input element 7b bears on the bearing shaft 6, and is functionally connected to the spring mechanism 8. The respective input elements 7a, 7b form annular disks, and have numerous holes 10 for axially inserting connecting means 11 between the drive shaft 1 and the bearing shaft 6. In the present case, there are two connecting means 11 in the form of shear pins in the intersection surface. The connecting means 11 extend, at least in part, axially through the drive shaft 1 and the bearing shaft 6, as well as entirely through the respective holes 10 on the respective input elements 7a, 7b. The output element 9 is located on the front surface of the belt disk 4, and is connected to the belt disk 4 for conjoint rotation via screws. In the present case, the output element is in the form of an annular disk.

According to FIG. 2, the spring mechanism 8 of the torsional vibration damper 3 couples an input element 7 to two output elements 9a, 9b such that vibrations are dampened. The input element 7 bears axially between the drive shaft 1 and the bearing shaft 6, and is functionally connected to the spring mechanism 8. The input element 7 is in the form of an annular disk, and has numerous holes for axially inserting connecting means 11 between the drive shaft 1 and the bearing shaft 6. In the present case, there are two connecting means 11 in the form of screw elements in the interaction surface. The connecting means 11 extend, at least in part, axially through the drive shaft 1 and the bearing shaft 6, and entirely through the respective holes 10 on the input element 7. The first and second output elements 9a, 9b form a housing for the torsional vibration damper 3, wherein the first output element 9a forms a housing well, and the second output element 9b forms a housing cover. The first output element 9a is located on the front surface of the belt disk 4, wherein the second output element 9b bears at least in part on the front surface of the first output element 9a, and wherein both output elements 9a, 9b are connected to the belt disk 4 for conjoint rotation via screws.

Figure 3:
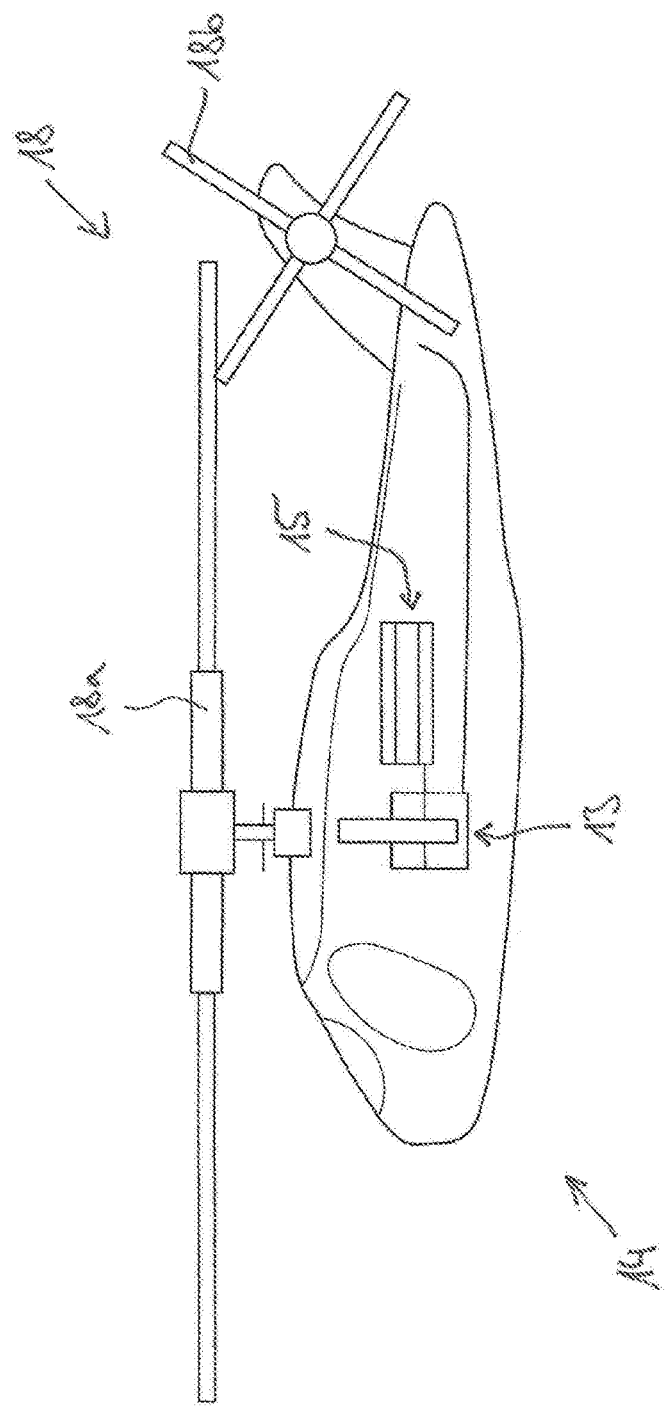
FIG. 3 shows a schematic illustration of a helicopter that has a belt drive arrangement according to the invention, integrated in the drive train.

A helicopter 14 with a belt drive arrangement 13 according to the invention is shown in FIG. 3. The belt drive arrangement 13 is functionally located in a drive train of the helicopter 14, wherein the drive train comprises a drive machine 15 at the input end, and a rotor system 18 at the output end, which has first and second rotors 18a, 18b.

REFERENCE SYMBOLS 1 drive shaft
2 crankshaft
3 torsional vibration damper
4 belt disk
5 bearing mechanism
5a first tapered roller bearing
5b second tapered roller bearing
6 bearing shaft
7 input element
7a first input element
7b second input element
8 spring mechanism
9 output element
9a first output element
9b second output element
10 hole
11 connecting means
12 ancillary drive shaft
13 belt drive arrangement
14 helicopter
15 drive machine
16 drive axis
17 belt track
18 rotor system
18a first rotor
18b second rotor 19a first seal
19b second seal
20 bearing cover
21 tensioning sleeve
22 bearing element

The invention claimed is:

1. A belt drive assembly for a drive train of a helicopter, comprising:
   a drive shaft that can be functionally connected to a crankshaft of a drive machine of the helicopter, wherein the drive shaft is functionally connected to a belt disk via a torsional vibration damper, wherein the belt disk can rotate via a bearing mechanism on a bearing shaft connected to the drive shaft for conjoint rotation therewith, wherein the belt disk can receive a belt that is functionally connected to a rotor system of the helicopter, and
   further comprising an ancillary drive shaft that-is connected to the belt disk for conjoint rotation, wherein the ancillary drive shaft can be functionally connected to an ancillary unit of the helicopter.

2. The belt drive assembly according to claim 1, wherein the torsional vibration damper comprises a spring mechanism, wherein the spring mechanism couples at least one input element to at least one output element such that vibrations are dampened.

3. The belt drive assembly according to claim 2, wherein the at least one input element is located axially between the drive shaft and the bearing shaft, and connected to the drive shaft and the bearing shaft for conjoint rotation.

4. The belt drive assembly according to claim 2, wherein the at least one input element is an annular disk, and has numerous holes for axially inserting connecting means between the drive shaft and the bearing shaft.

5. The belt drive assembly according to claim 2, wherein the at least one output element is located on the front surface of the belt disk and is connected to the belt disk for conjoint rotation.

6. The belt drive assembly according to claim 2, further comprising a first and second output element form a housing of the torsional vibration damper, wherein the first output element forms a housing well, and the second output element forms a housing cover.

7. The belt drive assembly according to claim 1, wherein the bearing mechanism comprises a first and second tapered roller bearing.

8. The belt drive assembly according to claim 7, wherein the two tapered roller bearings form an O-assembly.

9. A use of a belt drive assembly according to claim 1 in a drive train of a helicopter.

10. A helicopter that has a belt drive assembly according to claim 1.

11. A belt drive assembly for a drive train of a helicopter, comprising:
    a drive shaft that can be functionally connected to a crankshaft of a drive machine of the helicopter, wherein the drive shaft is functionally connected to a belt disk via a torsional vibration damper, wherein the belt disk can rotate via a bearing mechanism on a bearing shaft connected to the drive shaft for conjoint rotation therewith, wherein the belt disk can receive a belt that is functionally connected to a rotor system of the helicopter,
    wherein the torsional vibration damper comprises a spring mechanism, wherein the spring mechanism couples at least one input element to at least one output element such that vibrations are dampened, and
    wherein the at least one input element is an annular disk, and has numerous holes for axially inserting connecting means between the drive shaft and the bearing shaft.

* * * * *